US012619641B2

(12) United States Patent
Wang et al.

(10) Patent No.: US 12,619,641 B2
(45) Date of Patent: May 5, 2026

(54) FINDING SIMILAR DOCUMENTS USING LEAST FREQUENT TERMS

(71) Applicant: Microsoft Technology Licensing, LLC, Redmond, WA (US)

(72) Inventors: Ge Wang, Sammamish, WA (US); Samuel J. Shelton, Kirkland, WA (US); Bhavanesh Rengarajan, Sammamish, WA (US); Nicholas James Robinson, Redmond, WA (US); Sundar Kameswaran, Redmond, WA (US); Venkata Rao Saladi, Redmond, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 18/600,627

(22) Filed: Mar. 8, 2024

(65) Prior Publication Data
US 2025/0284718 A1 Sep. 11, 2025

(51) Int. Cl.
*G06F 16/3332* (2025.01)
*G06F 16/31* (2019.01)
(Continued)

(52) U.S. Cl.
CPC ........ *G06F 16/3334* (2019.01); *G06F 16/322* (2019.01); *G06F 16/3326* (2019.01); *G06F 16/338* (2019.01)

(58) Field of Classification Search
CPC ............... G06F 16/3334; G06F 16/322; G06F 16/3326; G06F 16/338
(Continued)

(56) References Cited

U.S. PATENT DOCUMENTS

| | | | | |
|---|---|---|---|---|
| 2003/0046307 | A1* | 3/2003 | Rivette | G06F 16/382 707/E17.093 |
| 2010/0205202 | A1* | 8/2010 | Yang | G06F 16/532 707/E17.03 |

(Continued)

OTHER PUBLICATIONS

ArcGIS Pro: "How Inverse Distance Weighted Interpolation Works," retrieved from internet URL: https://pro.arcgis.com/en/pro-app/latest/help/analysis/geostatistical-analyst/how-inverse-distance-weighted-interpolation-works.htm, retrieved on Feb. 23, 2024, pp. 1-3.

(Continued)

*Primary Examiner* — Cam Y T Truong
(74) *Attorney, Agent, or Firm* — Barta Jones, PLLC

(57) ABSTRACT

A computer-implemented method for performing a document search action includes receiving a search request identifying a sample document. A plurality of terms occurring within the sample document is identified. Each term is scored based on a global term frequency of that term within a collection of documents. Each term is then weight based on proximity, within the sample document, of that term to at least one of the other terms of the first plurality of terms. A document search query is created to include a proximity-limiting clause restricting results to include documents that have a highest-weighted term of the first plurality of terms within a threshold distance of another term of the first plurality of terms. The document search query is performed, thereby resulting in identification of a first resulting document.

20 Claims, 4 Drawing Sheets

(51) Int. Cl.
    *G06F 16/332*         (2025.01)
    *G06F 16/338*         (2019.01)
(58) Field of Classification Search
    USPC ........................................................ 707/748
    See application file for complete search history.

(56)           References Cited

U.S. PATENT DOCUMENTS

| | | | |
|---|---|---|---|
| 2011/0029501 A1* | 2/2011 | Kirovski | G06F 16/334 |
| | | | 707/706 |
| 2011/0314059 A1* | 12/2011 | Hu | G06F 16/951 |
| | | | 707/E17.014 |
| 2014/0149516 A1* | 5/2014 | Paulraj | H04L 51/18 |
| | | | 709/206 |
| 2015/0186417 A1* | 7/2015 | Olteanu | G06F 16/24578 |
| | | | 707/748 |
| 2015/0317390 A1* | 11/2015 | Mills | G06F 16/35 |
| | | | 707/777 |
| 2017/0357699 A1* | 12/2017 | Borios | G06F 16/3334 |
| 2021/0157858 A1* | 5/2021 | Stevens | G06F 40/237 |
| 2024/0160902 A1* | 5/2024 | Padgett | G06N 3/0895 |
| 2024/0232139 A9* | 7/2024 | Behera | G06F 16/1748 |

OTHER PUBLICATIONS

Balikas, et al., "Cross-Lingual Document Retrieval Using Regularized Wasserstein Distance," arXiv, May 11, 2018, pp. 1-12.

GeeksforGeeks: "Understanding TF-IDF (Term Frequency-Inverse Document Frequency)," retrieved from internet URL: https://www.geeksforgeeks.org/understanding-tf-idf-term-frequency-inverse-document-frequency/, retrieved on Feb. 23, 2024, pp. 1-16.

Mohammed, et al., "Document Retrieval Using Term Frequency Inverse Sentence Frequency Weighting Scheme," Indonesian Journal of Electrical Engineering and Computer Science, vol. 31, No. 3, Sep. 2023, pp. 1478-1485.

Papineni, Kishore, "Why Inverse Document Frequency?," Second meeting of the North American Chapter of the Association for Computational Linguistics on Language technologies NAACL, Jun. 2001, pp. 1-8.

Rathi, et al., "The importance of Term Weighting in semantic understanding of text: A review of techniques," 1222: Intelligent Multimedia Data Analytics and Computing, Multimedia Tools and Applications, vol. 82, 2023, pp. 9761-9783.

Stack Overflow: "Cosine Similarity and Tf-Idf," retrieved from URL: https://stackoverflow.com/questions/6255835/cosine-similarity-and-tf-idf, retrieved on Feb. 23, 2024, pp. 1-5.

Wikipedia, "Tf-idf," Retrieved from Internet URL: https://en.wikipedia.org/w/index.php?title=Tf-idf&oldid=1192807784, last edited on Dec. 31, 2023, 6 pages.

* cited by examiner

200

300

400

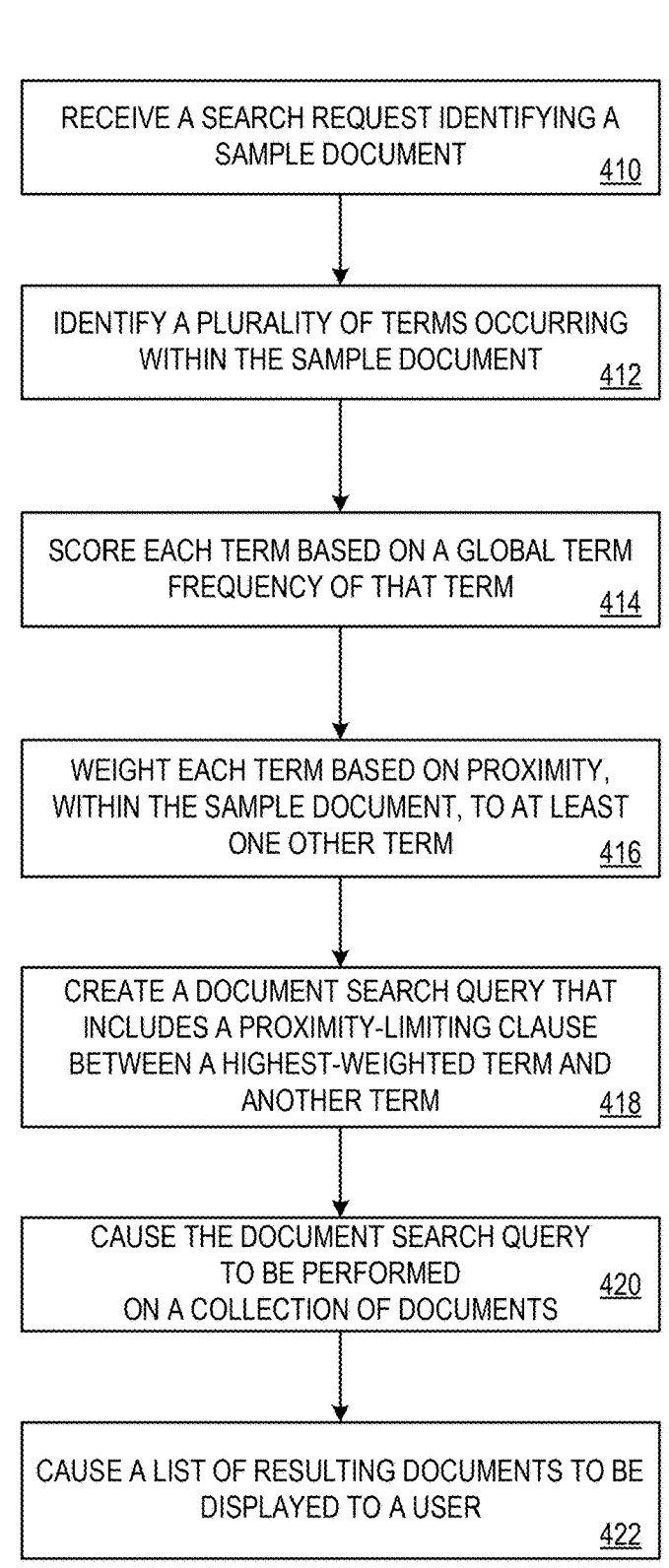

RECEIVE A SEARCH REQUEST IDENTIFYING A SAMPLE DOCUMENT    <u>410</u>

IDENTIFY A PLURALITY OF TERMS OCCURRING WITHIN THE SAMPLE DOCUMENT    <u>412</u>

SCORE EACH TERM BASED ON A GLOBAL TERM FREQUENCY OF THAT TERM    <u>414</u>

WEIGHT EACH TERM BASED ON PROXIMITY, WITHIN THE SAMPLE DOCUMENT, TO AT LEAST ONE OTHER TERM    <u>416</u>

CREATE A DOCUMENT SEARCH QUERY THAT INCLUDES A PROXIMITY-LIMITING CLAUSE BETWEEN A HIGHEST-WEIGHTED TERM AND ANOTHER TERM    <u>418</u>

CAUSE THE DOCUMENT SEARCH QUERY TO BE PERFORMED ON A COLLECTION OF DOCUMENTS    <u>420</u>

CAUSE A LIST OF RESULTING DOCUMENTS TO BE DISPLAYED TO A USER    <u>422</u>

FIG. 4

FINDING SIMILAR DOCUMENTS USING LEAST FREQUENT TERMS

BACKGROUND

Finding similar or related content within an organization is a key challenge for data investigators. An entire investigation can often hinge on the ability to find relevant content and communications. Organizations spend time and resources to identify and collect potentially relevant content to address security investigations, regulatory or policy requirements, or in litigation, for example. Finding documents by similarity is a technical problem in information retrieval and analysis. While some search techniques such as file hash or search term matching have been developed, these existing techniques often exhibit poor performance.

SUMMARY

The disclosed examples are described in detail below with reference to the accompanying drawing figures listed below. The following summary is provided to illustrate some examples disclosed herein. The following is not meant, however, to limit all examples to any particular configuration or sequence of operations.

Example solutions for performing a document search include: identifying terms occurring within a sample document; scoring each of the terms based at least in part on a global term frequency of the term within a collection of documents; weighting the score for each term based on proximity, within the sample document, of the term to at least one of the other terms; creating a document search query that includes a proximity-limiting clause restricting a result of the document search query to include documents that have a highest-weighted term of the first plurality of terms within a threshold distance of another term of the first plurality of terms; causing the document search query to be performed on a collection of documents, thereby resulting in identification of a first resulting document.

BRIEF DESCRIPTION OF THE DRAWINGS

The disclosed examples are described in detail below with reference to the accompanying drawing figures listed below:

FIG. 4 is a flowchart illustrating exemplary operations that may be performed by the system such as that of FIG. 1 for performing a document search action using a sample document.

Corresponding reference characters indicate corresponding parts throughout the drawings. Any of the drawings may be combined into a single example or embodiment.

DETAILED DESCRIPTION

Figure 1:
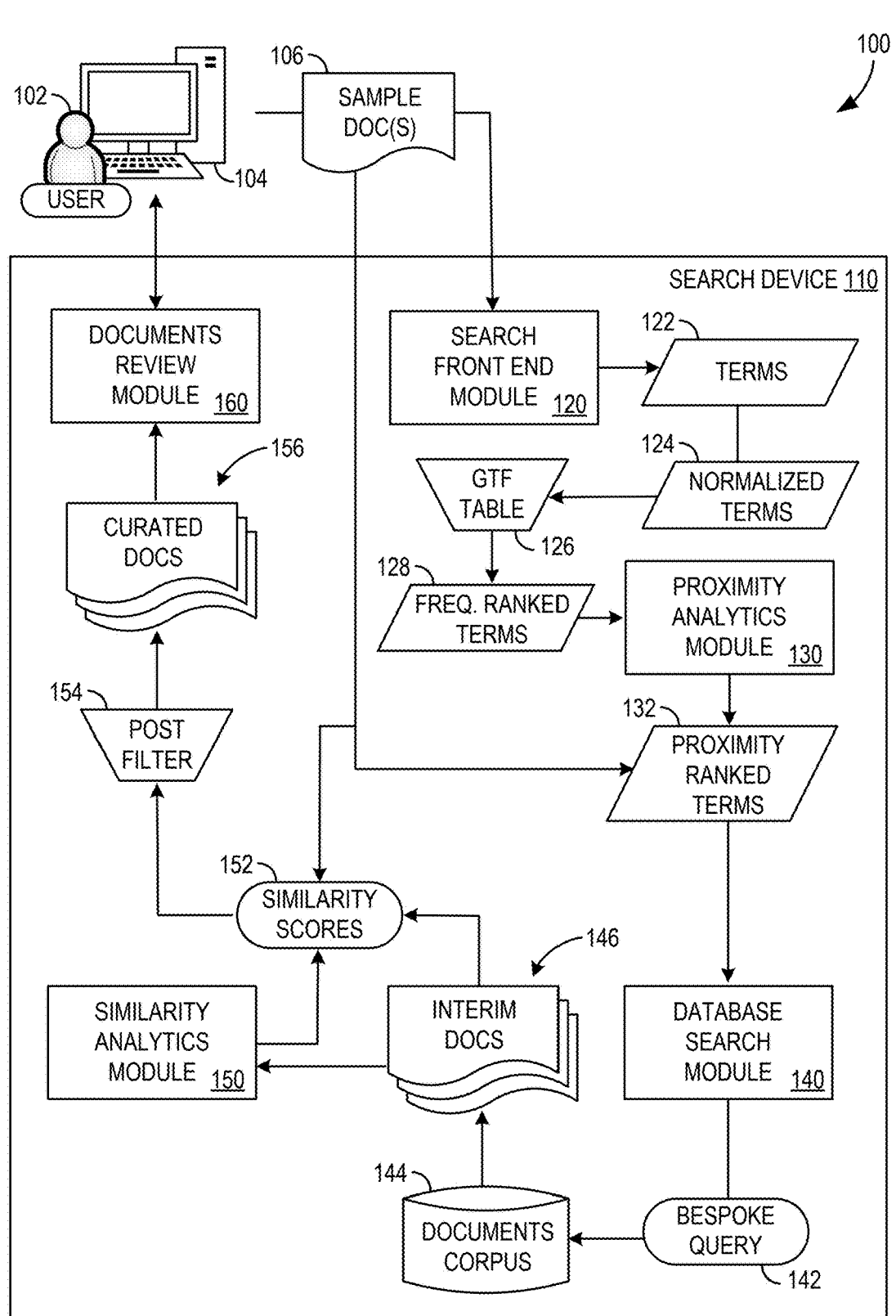
FIG. 1 illustrates an example search system that facilitates searching a corpus of documents based on similarity to one or more sample documents.

In some examples, a search system is provided that facilitates searching a corpus of documents given one or more "sample documents" that are identified as being pertinent to the search. More specifically, an example search system allows the investigator to initiate a search by identifying a sample document (e.g., a text-inclusive document, such as an email, a web page, a word processing document, a PDF, or the like). A search device analyzes this sample document for "term frequency" as well as "term global frequency". Term frequency refers to calculating the relative frequency of each term within the document, as a measure of how important each term is to the sample document. Term global frequency refers to a measure of how common or uncommon a given term typically occurs across a particular set of documents, such as via inverse global frequency. In some examples, the search device uses "frequency bins" to calculate term global frequency, where each frequency bin includes a particular frequency value and a plurality of words that share that particular frequency value. The search device uses the term frequency and term global frequency to identify and rank terms that are significant in the sample document and that are also uncommon words.

The search device also evaluates each top term based on its distance, within the sample document, to each of the other top terms (e.g., as identified by the term frequency rankings). More specifically, the search device calculates a distance-weighted aggregation of inverse global frequency for each particular top term from neighbors of all its occurrences (e.g., based on a threshold distance from the term to the neighbor top term within the example document). As such, this additional ranking provides a proximity-ranked list of terms that considers both the term frequency and the proximity of such terms to each other.

The search device uses the proximity-ranked list of terms to generate a bespoke query that can be used during a search of a corpus of documents. In examples, the search device generates a Boolean search using proximity and distance restrictions in the search query, and this bespoke query is executed on a distributed, indexed database of documents to identify an initial set of documents (or "interim documents"). These interim documents thus represent the documents that have a high number of top terms appearing nearest each other within the document. However, some of these interim documents may be false positives. As such, in some examples, the search device also generates similarity scores for each of the interim documents, where the similarity score represents a similarity between the interim document and the original sample document being used for the search. These similarity scores are used to filter out some of the least-similar interim documents. Further, the search device also applies additional filters to certain types of documents, for example, to remove duplicate or non-inclusive documents based on email threading or exact duplicate detection.

Once all scoring and post-processing filters have been applied, the search results in a curated set of documents that is provided to the investigator by the search system. The search system provides a user interface through which the investigator, for example, inspects any of the documents or metadata associated with those documents, marks documents as relevant or irrelevant to the current investigation, or even generates additional searches based on one or more of the identified documents.

Since the search system is executing keyword search instead of a highly costly vector-based similarity search, the computation resource cost is greatly reduced relative to existing systems, particularly for very large datasets. For example, the example keyword searches on a b-tree indexed database is $O(\log n)$. The example methods described herein for finding similar documents using sample text content provide automatic isolation of logical groupings or chunks of content for analysis, deriving unique keyword patterns based on proximity and globally least frequent terms to identify the unique nature, tone, and context of the provided content. From this analysis, a bespoke query is generated to search and identify highly related content items and variants of the provided content across different content types and locations.

There are various use cases for examples of the disclosure in which users wish to search a corpus of documents for particular content. In a data leak example, an attacker surreptitiously gains access to privileged documents from an enterprise network or system. During an investigation, a user (e.g., the "investigator") may have identified some portion of content that has been leaked, and may thus be tasked with searching for documents similar to that content. In a litigation example, an organization wishes to search for documents related to aspects of the litigation, and the investigator may be tasked with searching for documents similar to some source example documents that are known to be related to the litigation. Aspects of the disclosure provide a mechanism for performing a document search based on one or more documents identified by the investigator, such as for use in the above two examples.

Examples of the search system improve computational efficiency of document search functions by identifying terms from an input document, scoring those terms based on global term frequency, and weighting those term scores based on local term proximity (e.g., proximity of that term to other terms within the sample document. Creating a document search query that includes a proximity-limiting clause restricting a result of the document search query to include documents based on highest-weighted terms near to each other allows both helps reduce computational burdens on document search systems as well as reduce network bandwidth usage between those search systems and users of such systems. Since the example document search system can find related documents more efficiently, less subsequent searches will need to be performed by users, thus reducing the search burden on the system.

The various examples are described in detail with reference to the accompanying drawings. Wherever preferable, the same reference number is used throughout the drawings to refer to the same or like parts. References made throughout this disclosure relating to specific examples and implementations are provided solely for illustrative purposes but, unless indicated to the contrary, are not meant to limit all examples.

FIG. 1 illustrates an example search system 100 that facilitates searching a corpus of documents 144 based on similarity to one or more sample documents 106. In some examples, a user 102 (also referred to herein as an "investigator" based on certain example use cases) interfaces with the search system 100 via a user computing device 104 to initiate a document search. For example, the user 102 is performing a security investigation after a data leak or a security breach has been detected within an organization. In such situations, the user 102 may have identified some documents that are related to the security investigation, such as a partial or complete copy of leaked content, and may wish to find the original source document or other similar documents. As such, the search system 100 provides search functionality that accepts, as an initial input for a search action, one or more "sample documents" 106 that are then used to guide a search for documents similar to those sample documents 106.

In the example, a search device 110 provides a search front end module 120 that initiates a search action upon receipt of the sample document(s) 106. In some examples, the search front end module 120 provides a user interface and/or exposes an application programming interface (API) to the user computing device 104 for managing the search action (e.g., submitting the sample document(s) 106, configuring the search via various parameters, thresholds, and the like as described herein). In some examples, the search action may be automatically initiated based on a precipitating event, such as, for example, receipt of an online meeting transcription (e.g., upon conclusion of an online meeting and subsequent transcript generation, thus identifying other documents that may be related to subjects discussed in the meeting), the viewing or editing of the sample document 106 (e.g., automatically identifying other documents that may relate to the document 106, thereby displaying other related documents as the sample document 106 is being viewed or edited), or from an automated audio or video analysis system (e.g., after capturing and transcribing text from the captured media).

Upon receipt of the sample document 106, the search front end module 120 is configured to analyze the sample document 106 to extract terms that appear in the document 106. In examples, the search front end module 120 extracts terms from the document 106 using a regular expressions (REGEX) tokenizer. The REGEX tokenizer includes a set of predefined rules configured as regular expressions, namely specific patterns that are used to identify tokens (e.g., terms 122) within text of the document 106. The tokenizer scans the text of the document and splits that text wherever it finds sequences that match the defined patterns. One of the key strengths of REGEX-based tokenization is customizability, as regular expressions can be customized to the specific needs of various types of text-based data. These extracted tokens are represented in FIG. 1 as terms 122.

In some examples, the search device 110 includes a single predefined set of regular expressions that are used for all documents of a search action, or a default set of regular expressions that are used for documents when no other specific set is identified. In some examples, the search device 110 includes a specific set of rules for certain document types. For example, the search device 110 is configured with one set of rules for PDF or word processing-type documents, another set of rules for email-type documents or text message-type documents, and still another set of rules for transcript-type documents, as less-formal documents or spoken language from transcript-type documents can have different informalities or language usage that do not typically appear in more formally-written documents. In such examples, upon receipt of the sample document 106, the search front end module 120 also identifies a document type for each of the sample documents 106 and then applies a particular set of rules during tokenization of that document 106 based on the document type. In some examples, the search front end module 120, alternatively, uses a whitespace tokenizer or a punctuation-based tokenizer that splits text based on white space and/or punctuation (e.g., separating words whenever spaces, tabs, new line characters, or the like, are encountered).

Upon identification of the tokens (e.g., terms 122) of the sample document 106, in some examples, the search front end module 120 also performs a token normalization operation on the terms 122 to generate normalized terms 124. Token normalization include, for example, converting all characters of the terms 122 to lower or upper case, removing punctuation, stemming/lemmatization (e.g., reducing words to their base or root form), or the like. Normalization helps in reducing redundancy and complexity in the terms 122. In some examples, the search front end module 120, at this stage, filters out some terms 122 (e.g., terms that are common, and are thus likely to be insignificant to search actions, such as commonly-used pronouns, verbs, adverbs, prepositions, or the like).

In an example, the search front end module 120 computes a (local) term frequency for each of the normalized terms 124. More specifically, the local term frequency of any particular term 124 is calculated as the relative frequency of that particular term within the sample document 106 (e.g., as a measure of how important that term is to this particular sample document 106). In examples, the local term frequency is computed by counting the number of occurrences of the term within the document 106 and dividing the result by the total number of terms 122 in the document 106. The search front end module 120 thus computes the term frequency for each normalized term 124.

In the example, the search front end module 120 also uses a global term frequency (GTF) table 126 to identify a global frequency for each of the normalized terms 124. More specifically, the GTF table 126 is constructed from a large and diverse collection of documents (e.g., content items from the Internet, from a domain-specific collection, from the documents corpus 144 of the organization, or the like) to identify the relative frequency of various terms within that corpus of documents (e.g., where a higher frequency identifies words that appear more often in that underlying collection of documents, and a lower frequency identifies words that appear less often).

In some examples, the GTF table 126 includes a frequency value for each term of a large set of terms, and the search front end module 120 uses the GTF table 126 to look up and assign a global frequency value to each term. However, to improve performance of this step and to reduce the storage costs associated with this GTF table 126, in an example, the GTF table 126 is configured as a set of buckets (or bins), where each bucket includes a bucket index (e.g., a unique identifier for that bucket), a list of terms that are included in that bucket (e.g., hundreds or thousands of words of nearly equivalent global frequency), and a (global) frequency value (e.g., defining what global frequency value is to be assigned any of the words that are included in the bucket). In some examples, the frequency buckets of the GTF table 126 include a wordlist of words that appear at least once per 100 million words (in the particular collection of documents used to construct the GTF table 126). The GTF table 126 is compressed to a compact format to group all terms of a similar frequency in the same bucket, thus reducing storage costs, in some examples. The frequency buckets format sacrifices minimal precision for the benefit of packing the words into frequency buckets, where in some examples, the compressed database for the GTF table 126 can be only a few megabytes (MBs) of data. In some examples, term global frequency data for the GTF table 126 is extracted from open sources such as project Wordfreq, which corpus compiles eight different domains of text: Wikipedia (e.g., representing encyclopedic text), Subtitles (e.g., from OPUS OpenSubtitles 2018 and SUBTLEX), News (e.g., from NewsCrawl 2014 and GlobalVoices), Books (e.g., from Google Books Ngrams 2012), Web text (e.g., from OSCAR), Twitter (e.g., representing short-form social media), and Reddit (e.g., representing potentially longer Internet comments). As such, each normalized term 124 is assigned a global frequency value from one of the buckets defined by the GTF table 126.

In examples, the search front end module 120 uses both the local term frequency and the global term frequency to score and rank each of the normalized terms 124 based on its term frequency and inverse term global frequency (TF-ITGF). TF-ITGF is a measure of importance of a particular word (e.g., one of the normalized terms 124) to a particular document (e.g., the sample document 106), where a high weight of TF-IGTF for a given term 124 is reached by a high (local) term frequency of that term 124 in the document 106 and a low global frequency of that term 124. More specifically, as an example, the search front end module 120 calculates the TF-IGTF value for each term 124 as:

$$TF\text{-}ITGF = \frac{\text{Local Term Frequency}}{\text{Global Term Frequency}}$$

As such, the search front end module 120 uses the TF-ITGF value to generate frequency ranked terms 128, namely a list of the normalized terms 124 that are sorted/ranked by their TF-ITGF values (e.g., with higher values being the more significant terms 128). In some examples, the search front end module 120 removes some of the normalized terms 124 from the frequency ranked terms 128 based on, for example, being below a predefined threshold (e.g., removing lower-ranked terms 124), or removing a certain percentage of terms 124 (e.g., keeping only the top 50% of terms 128 based on their TF-ITGF values).

In the example, the frequency ranked terms 128 are processed by a proximity analytics module 130 to evaluate the terms 128 based on how the various terms 128 are grouped together within the sample document 106. When high-ranked terms 128 appear close together with other high-ranked terms 128, these particular terms 128 are given a greater weight (as compared to other terms 128 that do not appear near other terms 128). This proximity weighting automatically isolates significant chunks of the sample document 106 by increasing the weight of some of the terms 128 over others. For example, the proximity analytics module 130 uses the following pseudo-code to generate proximity ranked terms 132 from the set of frequency ranked terms 128:

```
Function: Generate distance-weighted aggregation of inverse global frequency for a
    given term (TermInput) from neighbors of all its occurrences within the sample doc
TotalWeightOfNeighbors = 0;
foreach TermOccurrence of TermInput
    foreach TermNeighbor of TermOccurrence
        If ((TermNeighbor != TermOccurrence) && (Distance(TermNeighbor,
            TermOccurrence) < Threshold)) {
            WeightOfNeighbor = Log(InverseGlobalFrequency(TermNeighbor)) /
                Distance(TermNeighbor, TermOccurrence)
            TotalWeightOfNeighbors += WeightOfNeighbor }
Return Log(InverseGlobalFrequency(TermInput)) * NumberOfOccurrence +
    TotalNeighborWeight
```

After weight for all terms 128 are calculated, the terms 128 are sorted by their weights to generate the proximity ranked terms 132. In some examples, the proximity analytics module 130 also filters the proximity ranked terms 132 (e.g., based on a predetermined threshold percentage, such as the top X % of terms 132, based on a predetermined number of terms, such as the top 20 terms 132, based on a predetermined threshold, such as terms 132 with weights over a threshold weight value, or the like). These proximity ranked terms 132 are used to generate a proximity-related document search as the most significant terms 132.

A database search module 140 uses the proximity ranked terms 132 to generate a bespoke query 142 that is used to search the documents corpus 144 for similar documents. In some examples, the query 142 is configured as a term-based search, namely to search for documents having any or all of the proximity ranked terms 132 (e.g., based on a threshold term count of the proximity ranked terms 132 appearing in the particular document 146).

In other examples, the query 142 is configured to utilize proximity between terms as they appear in the searched documents. More specifically, in the example, the database search module 140 generates a Boolean search expression based on proximity and distance restrictions. For example, the database search module 140 uses the following pseudo-code to generate the bespoke query 142 from the set of proximity ranked terms 132:

```
Function: Generate Boolean search expression for the sample document 106
    (Document) from proximity ranked terms 132 (TopRankedTerms) within a
    Threshold distance
PrevTerm = null; SearchExpression = empty;
foreach Term in Document
    if Term is in TopRankedTerms
        if ((PrevTerm != null) && (Distance(PrevTerm, Term) < Threshold))
            SearchExpression += nearSearch(PrevTErm, Term, Distance(PrevTerm,
                Term)
        else
            SearchExpression += Search(Term)
        PrevTerm = Term
Return SearchExpression
```

As such, the bespoke query 142 is constructed to search for documents within the documents corpus 144 using a particular number of most significant terms (e.g., as identified in the proximity ranked terms 132), and having other most significant terms appearing within a certain distance (e.g., "Threshold") of the other term(s) (e.g., effectively a sliding window of size 2*Threshold before/after the term).

An example sample document 106 has the following text:

The Autonomous Flight Safety System (AFSS) automatically issued a destruct command, which fired all detonators as expected, after the vehicle deviated from the expected trajectory, lost altitude and began to tumble. After an unexpected delay following AFSS activation, Starship ultimately broke up 237.474 seconds after engine ignition. SpaceX has enhanced and requalified the AFSS to improve system reliability.

In an example, during analysis by the search front end module 120 and the proximity analysis module 130, the terms "AFSS", "detonators", "Starship", and "SpaceX" are identified as the proximity ranked terms 132 (e.g., presuming that these four terms have a low global frequency, and given that the term "AFSS" is separated by only eight places of the term "detonators", and the term "Starship" is separated by only eight places of the term "SpaceX" in the example). As such, the database search module creates the bespoke query 142 with an example search expression of (e.g., in search query expression pseudo-code):

```
. . . (AFSS NEAR: 10 detonators) AND (Starship
        NEAR: 10 SpaceX)
``` where the operator "NEAR:10" defines a proximity relationship between the first term and the second term of the clause, with a distance threshold of 10. In other words, including the above example search query expression in the bespoke query 142 results in matching documents that have both the term "AFSS" appearing within 10 words of the term "detonators" and the term "Starship" appearing within 10 words of the term "SpaceX".

Accordingly, the database search module 140 submits the bespoke query 142 to the documents corpus 144 to perform a document search operation. In examples, the query 142 is executed on a distributed indexed database (e.g., a b-tree indexed database of documents). This document search results in a set of interim documents 146, as shown in FIG. 1.

In an example, a similarity analytics module 150 generates similarity scores 152 for each of the interim documents 146 at this stage. More specifically, the similarity analytics module 150 computes a similarity score between the sample document 106 and each particular interim document 146. The similarity analytics module 150 converts the sample document 106 and each of the interim documents 146 to vector representations (e.g., using "Bag of Words" algorithm, term frequency-inverse document frequency (TF-IDF), word embeddings like Word2Vec, or the like). The similarity analytics module 150 uses the vectorized representations to calculate a similarity score 152 (e.g., using cosine similarity) for each pairing of the sample document 106 with one of the interim documents 146, defined as:

$$\text{similarity score} = \frac{A \cdot B}{\|A\| \cdot \|B\|},$$

where A and B are the vector representations of the sample document 106 and one of the interim documents 146, A·B is the dot product of the vectors, and $\|A\|$ and $\|B\|$ are the magnitudes (e.g., Euclidean norms) of the vectors. The result of the similarity score 152 is between −1.0 and +1.0, where +1.0 indicates identical direction (and thus high similarity), 0 indicates orthogonality (no similarity), and −1.0 indicates completely opposite directions (which is rare in text similarity cases).

As such, a similarity score 152 is computed for each of the interim documents 146. In an example, the similarity analytics module 150 also performs one or more filtering processes of the interim documents 146 at this stage. These filtering processes, represented in FIG. 1 as post filter 154, serve to cull the set of interim documents 146 into a set of "curated documents" 156, namely those documents 156 that will be shown to the user 102.

In some examples, the post filtering 154 includes using the similarity scores 152 of the interim documents 146 to filter out some of the interim documents 146 from appearing in the curated documents 156. For example, the similarity analytics module 150 removes or deselects interim documents 146 that have a similarity score below a predetermined threshold, or may remove or deselect the lowest percentage of interim documents 146 (based on similarity score 152).

In some examples, the post filtering 154 includes removing exact duplicates from the interim documents 146. For example, the similarity analytics module 150 generates hash values for each of the interim documents 146 and uses those hash values to identify identical documents, removing or deselecting all but one of the identical documents.

Upon selection and filtering, the search device 110 has identified a set of curated documents 156 that are prepared for presentation to, and inspection by, the user 102. In the example, the search device 110 provides a documents review module 160 that is configured to display the results of the search action (e.g., the curated documents 156) to the user 102 (e.g., via the user computing device 104). For example, the documents review module 160 displays, or otherwise causes to be displayed, a list of the curated documents 156 (e.g., via an API response to the initial search, as HTML or other web browser-type content, via a client application executing on the user computing device 104, or the like), and includes other search metadata associated with this search action, such as the proximity ranked terms 132 identified during the search action, the similarity scores 152 of each of the curated documents 156, and a link to view the contents of the sample document 106 used for the search. The list of curated documents 156 includes, for example, interactive user interface elements that allow the user 102 to click on any document 156 in the list, thereby causing the search device 110 to display the full contents of the associated document 156 (e.g., as read only in a document viewer). During viewing, the document viewer highlights occurrences of the proximity ranked terms 132 appearing within each document 156.

In some examples, the document review module 160 allows the user 102 to remove documents from the set of curated documents 156. In some examples, the document review module 160 allows the user 102 to initiate a new search action based on one or more of the curated documents 156, for example by marking one or more of the curated documents 156 (and possibly also including the original sample document 106) and initiating a new search action with those marked documents. Upon initiating a new search action, the search device 110 sends the marked document(s) to the search front end module 120 as sample document(s) 106 for a new search action. In some examples, this second search incrementally adds documents to the set of curated documents 156.

As such, the search system 100 allows the user 102 to perform document searches based on one or more sample documents 106, and based on identification of inverse global frequency ranked terms and term proximity within the searched documents. Because the search system 100 is executing keyword search instead of a highly costly vector-based similarity search, the computation cost is greatly reduced, particularly for very large datasets. For example, the example keyword searches on a b-tree indexed database is O(log n). These examples locate similar documents using one or more sample documents 106, thereby providing automatic isolation of logical groupings or chunks of content for analysis and deriving unique keyword patterns based on proximity and globally least frequent terms to identify the unique nature, tone, and context of the provided content. This analysis allows the search system to construct a bespoke query that can be used to search and identify highly related content items and variants of the provided content across different content types and locations.

For ease of illustration, some examples are described herein in terms of a single sample document 106 being provided by the user 102 during initiation of a search action. However, it should be understood that the search system 100 accommodates multiple sample documents 106 for any given search action. Further, while the sample document(s) are described in the example as being identified by the user 102 during initiation of a search action, it should be understood that the search system 100 accommodates initiation of search actions by other means (e.g., automatic initiation by some other automated process or system). Additionally, while many of the components of the search system 100 are illustrated as part of the search device 110, it should be understood that other architectures are possible, and that any architecture that supports the systems and methods described herein are within scope of this disclosure. Further, while the documents corpus 144 is shown in FIG. 1 as being a part of the search device 110 for ease of description, it is also anticipated that the documents corpus 144 can be external to the search device 110. For example, organizations often use a document management solution within an enterprise network or cloud computing environment and, as such, the documents corpus 144 represents that database of documents. Further, while some example document types for the sample document(s) 106 are described herein (e.g., email-type documents, PDFs, word processing documents, instant messaging documents), it should be understood that the search system 100 can support any document type that expressly includes text-based content or that implicitly includes content that can be analyzed to determine text-based content (e.g., determining text-based content from audio-type or video-type content via a speech-to-text converter, determining text-based content from image-based content, such as via optical character recognition (OCR) or the like).

Additionally, while example outputs of the search device 110 and search system 100 (e.g., curated docs 156) are described herein as being provided to the user 102 (e.g., via documents review module 160 and a user interface), it should be understood that the outputs can, additionally or alternately, be provided to other post-processing systems (not shown), such as compliance systems, security systems, text, audio, or video post-processing systems, or the like (e.g., as input(s) to such systems).

Figure 2:
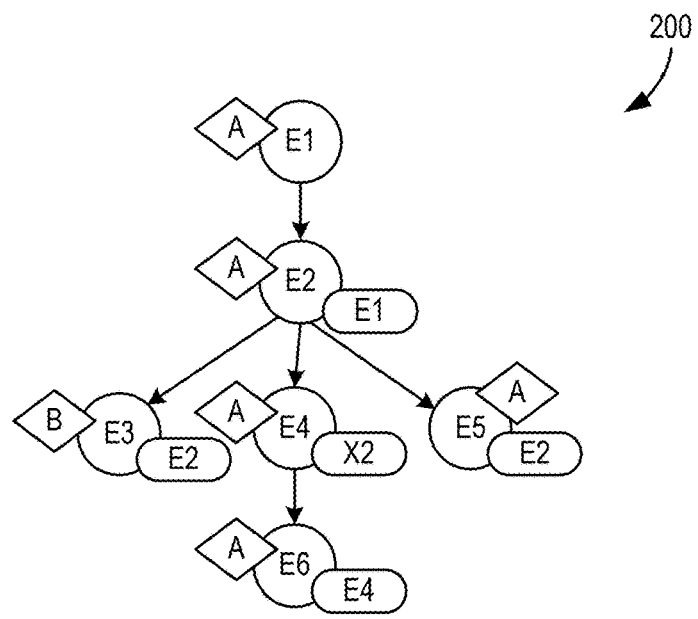
FIG. 2 illustrates an example email thread tree constructed for an email thread of conversation occurring between multiple participants that may be used to reduce the number of documents presented in response to a document search, such as the search action of FIG. 1.

FIG. 2 illustrates an example email thread tree 200 constructed for an email thread of conversation occurring between multiple participants that may be used to reduce the number of documents presented in response to a document search such as the search action of FIG. 1. Email messages (also referred to herein as "email-type documents", "email documents", or just "emails") are often exchanged in a conversational manner, resulting in multiple messages that belong to the same topic or thread. However, not all email clients or servers support thread grouping, and some messages may be lost, duplicated or forked due to different reply modes or recipients. Aspects of the disclosure group email messages into conversation threads and identify a reduced number of email documents that contain the most information about the topic.

For example, during a search action such as described in FIG. 1, one or more of the interim documents 146 includes an email-type document that was identified based on the proximity ranked terms 132 of the search action. In some situations, the search action only yields one email in a conversation thread, but investigators may wish to view the best set of one or more email documents that provide a more complete summary of that conversation thread. As such, it may be beneficial to add additional documents or change which email documents from the conversation thread end up being included in the curated documents 156. In some situations, the search action yields multiple emails from the same conversation thread, but one or more of those emails are duplicative of others of those emails (e.g., where a reply email may already contain all of the original contents of an original email, that original email can be treated as duplicative). As such, it may be beneficial to remove some email documents from the curated documents 156. Accordingly, in examples, the search device 110 performs an email analysis of interim documents 146 as part of a search action, prior to finalizing the curated documents 156 for presentation to the user 102.

In an example, the email thread tree 200 shown in FIG. 2 is a directed graph constructed by the search device 110 to include nodes that represent email documents (uniquely labeled as "E*" in circular elements, namely E1-E6) and edges connecting two nodes, where each edge represents a relationship between two emails (e.g., which email documents are replies to prior emails). Further, each reply email E2-E6 is presumed to include some additive content (e.g., the sender's reply to the parent email). Further, each reply email E2-E6 may also include a copy of content from the parent emails, as is typical in a "reply" or "reply all" function when replying to an email (the copied content of the parent email represented as "E*" in an oval element overlaying the circular element of that particular reply email).

For example, the email E2 is a reply to the email E1 (e.g., as indicated by the arrow connecting E1 to E2) and also includes the original contents of the E1 email (e.g., as indicated by the E1 oval overlaying the E2 node). However, in some situations, it is possible for the contents of a parent email to be copied in a child email, but then somehow changed or altered (e.g., as in editing or deleting some of the parent email contents when replying to that email). For example, the email E4 is a reply to the E2 email, but the sender changed the contents of the E2 email in the reply. This altered content is identified in graph 200 as "X*" (e.g., X2 being a change to the E2 contents included in the E4 email).

Additionally, graph 200 also represents a list of participants to each email as "A" or "B" in a diamond component overlaying each email. Each list of participants for a particular email includes the sender of that email as well as one or more other recipients of the email. For example, presume that the list of participants "A" includes three users, including the sender of email E1 and two recipients of email E1. In this example, all three of the participants "A" were a part of emails E2 and E4-E6 (as indicated by the "A" element overlaying each of those email nodes). However, email E3 has a different list of participants "B". For example, presume that one of the recipients of email E2 forwarded the email to a fourth user as email E3. As such, the participants "B" may include the sender of E3 and the one recipient of E3 (e.g., a participant list that is different than "A").

In the example, the search device 110 builds the email thread tree 200 based on one or more email documents identified as interim documents 146 or curated documents 156 during the search action. This graph 200 is built by extracting source thread information, such as a message ID, subject, sender, recipients, date, and references, from at least one seed email message then using that source thread information to search for other emails that are a part of that conversation thread, both potentially preceding and succeeding the current email.

In an example, the email E5 is the only email from this example conversation thread that is identified as an interim document 146 or a curated document 156 during a search action (e.g., because email E5 introduced particular ranked terms 132 in proximity to each other that were not in any of the parent email contents). As such, only the email document E5 is currently identified during the search. However, because the entire conversation thread may be of interest to the user 102, the search device 110 creates the tree 200, starting with the email document E5 as the "seed email document" for this graph construction operation.

Figure 3:
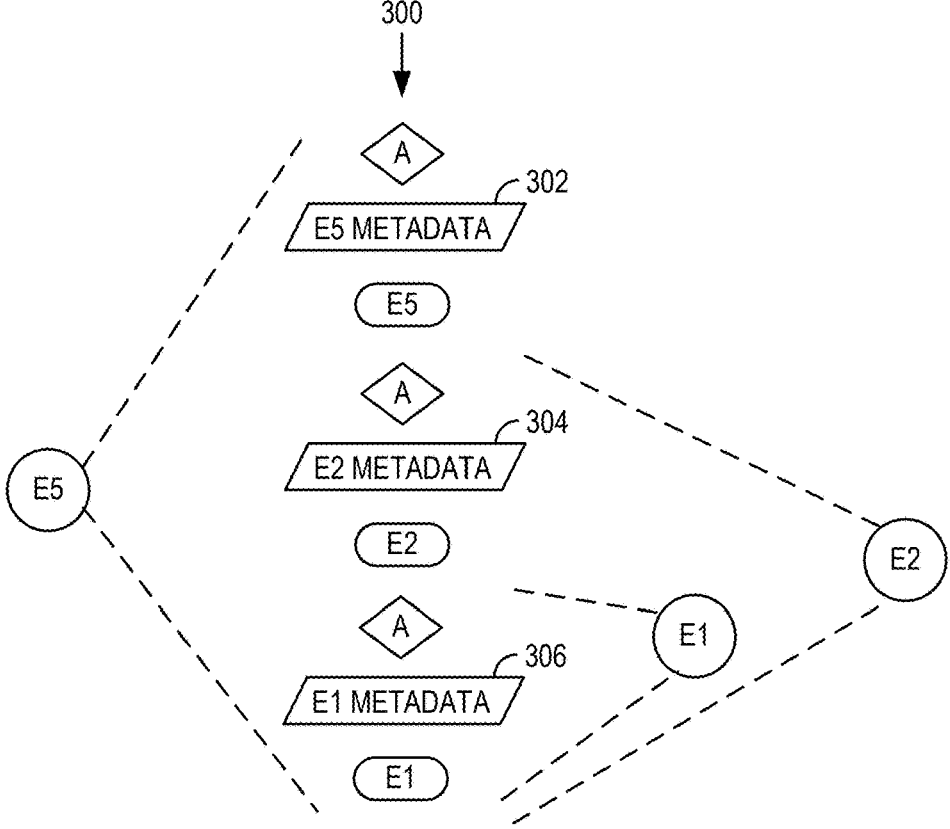
FIG. 3 illustrates an anatomy of the contents of the example email shown in FIG. 2.

For this example, FIG. 3 illustrates an anatomy of the contents 300 of email E5 shown in FIG. 2. More specifically, in this example, the email E5 includes a composite of new contents of the E5 email, in addition to the contents of the E2 email, which also has the contents of the E1 email embedded within it. More specifically, and from top down, the contents 300 of the E5 email include the participant list "A" (e.g., including the sender of email E5 and the other two participants as recipients), some E5 metadata 302 (e.g., subject line, send time, message ID, thread ID, attachments, and the like associated with email E5), and the new user content of the E5 email (represented as E5 oval component in FIG. 3), as well as the contents of the E2 email (e.g., participant list "A", E2 metadata 304, and E2 user content), and the contents of the E1 email (e.g., participant list "A", E1 metadata 306, and E1 user content).

Returning again to FIG. 2, in this example, the search device 110 creates the node E5 in the graph for the email document E5, adding the recipient list "A" and identifying the email E2 as the direct parent node of email E5. To expand the graph 200 from this current node E5, the search device 110 looks for both children of the email E5 (e.g., reply messages that originate directly or indirectly from that email E5) as well as the parent email E2. The search device 110 breaks the email E5 into parts (e.g., sequences of replies extracted from the body of the E5 email, and components within each particular reply). For example, from the E5 email, the search device 110 determines that the direct parent node of the E5 email is the E2 email, and from the contents of the E2 email (even as included in the E5 email, as shown in FIG. 3), the search device 110 determines that the direct parent of the E2 email is the E1 email. As such, the search device 110 has constructed all parent nodes E2, E1 of the seed email, E5.

To investigate the existence of children nodes of a particular email, such as E5, in some examples, the search device 110 searches the interim documents 146 for reply emails to email E5 (e.g., as those reply emails may also contain the same proximity ranked terms 132 in the same proximity, since they may contain the original contents of email E5). This interim document search can include identifying all email-type documents in the interim documents 146, decomposing those documents into their component parts (e.g., participant lists, email metadata, and email contents), and identifying the user content of email E5 within some other child email (e.g., via a signature of the email E5, such as a hash of the user content or other component parts). In some examples, the search device 110 searches the documents corpus 144 for other documents that may not have been included in the interim documents 146 by, for example, executing another search action by submitting the user content of email E5 as the sample document to the search front end module, then inspecting any of the resultant email-type documents as potential children of the E5 email.

In this example, the E5 email does not have any children reply emails and, as such, the child search branch does not result in any children nodes being constructed from E5 in the tree 200. However, each of the parent nodes E2 and E1 also need a similar search for children of those particular nodes E2, E1. In this example, a search for other children of the E1 node similarly does not find any additional children (other than the E2 node, which is already created in the tree 200. However, a search for children of the E2 node results in the identification of the E3 email (e.g., based on the user contents of the E2 email appearing in the E3 email) and of the E4 email (e.g., based on at least some of the user contents of the E2 email appearing in the E4 email, and perhaps sharing participants "A", or aspects of metadata).

As such, the search device 110 traverses the tree 200, constructing new nodes as children or parent email documents are identified for existing nodes in the tree 200, thereby building out the tree 200 until the conversation thread is complete. Once the tree 200 is complete, the search device 110 uses the tree 200 to identify a minimal set of documents that encompass the entirety of this conversation thread. In this example, the inclusion of email E5 email (e.g., based on the original search action) includes the contents of emails E1 and E2. However, if only email EE were included in the curated documents 156, the contents of emails E3, E4, and E6 would be excluded. As such, the search device 110 may add email E6 (thus also capturing the contents of email E4) as well as the email E3 into the curated documents 156, thus capturing all the conversation thread identified in the tree 200.

While the above example is provided as an extension to the search action of FIG. 1, it should be understood that the email graphing and searching operations of FIG. 2 and FIG. 3 can, additionally or alternatively, be provided in other ways. In one example, this email searching feature is provided by the user interface provided to the user 102 via the document review module 160. For example, if only the E5 email is identified in the curated documents 156, the user interface provides a feature that allows the user 102 to initiate exploration of the conversation thread of the E5 email, thus causing the search device 110 to generate the graph 200 and present the additional email documents (e.g., documents E3, E6) to the user 102. In another example, this feature is provided as part of a term-based email search, where the user 102 identifies one or more search terms that identify at least one email document in the conversation, and as a part of this example search, the search device 110 similarly constructs the graph 200 and identifies the other email documents of that conversation, presenting the user 102 with any or all of those documents in response.

In other examples, the search device 110 provides a dynamic method to identify and collate data from short-form messages (e.g., communications made via instant messaging platforms or apps, slack channels or other workplace messaging applications, SMS text messages, or the like). When an investigator executes a search such as those search actions described above, the appearance of one particular message may not yield much context for the conversation.

The investigator may wish to see other messages surrounding that identified message. In examples, the search device 110 builds transcripts that aim to optimize two factors: the number of messages retrieved and the total number of transcripts. This feature includes the following operations.

Given a keyword query, or given a particular message identified as a curated document 156, the search device 110 finds all messages that contain at least one message that matches the query. For each chat, the search device 110 uses a bloom filter to map out a time window that ranges before and after the matched message (e.g., based on a predefined threshold). The search device 110 retrieves all messages within that time window for each chat and groups them together into transcripts. The search device 110 applies an optimization technique that balances the number of messages retrieved and the total number of transcripts (e.g., by adjusting the time window threshold and the bloom filter parameters). The transcripts are ranked based on their relevance to the query (e.g., using a scoring function that considers the frequency and diversity of the keywords, the length and coherence of the transcripts, user feedback, and the like). As such, this method can effectively build transcripts that are more relevant, concise, and diverse than existing methods, while also reducing the number of messages retrieved and the total number of transcripts (e.g., reducing computing resource usage and improving the functioning of the underlying device).

FIG. 4 is a flowchart 400 illustrating exemplary operations performed by the system 100 of FIG. 1 for performing a document search action using a sample document. In examples, the method is performed by the search device 110 using the sample document 106 of FIG. 1. At operation 410, the search device 110 receives a search request, the search request identifying a sample document (e.g., sample document 106). At operation 412, the search device 110 identifies a first plurality of terms (e.g., terms 122) occurring within the sample document 106. At operation 414, the search device 110 scores each term 122 of the first plurality of terms based at least in part on a global term frequency of that term within a collection of documents. In some examples, scoring each term of the first plurality of terms further comprises: identifying a global term frequency (GTF) table that defines a plurality of frequency buckets, each frequency bucket of the plurality of frequency buckets includes an associated global frequency value and an associated plurality of words; searching the GTF table for a frequency bucket having each particular term of the first plurality of terms; and assigning the associated global frequency value of the associated frequency bucket as the score for the particular term.

At operation 416, the search device 110 weights each term 122 of the first plurality of terms based on proximity, within the sample document 106, of that term 122 to at least one of the other terms 122 of the first plurality of terms. At operation 418, the search device 110 creates a document search query (e.g., bespoke query 142) that includes a proximity-limiting clause restricting a result (e.g., interim documents 146) of the document search query to include documents that have a highest-weighted term of the first plurality of terms (e.g., from proximity ranked terms 132) within a threshold distance of another term of the first plurality of terms. At operation 420, the search device 110 causes the document search query to be performed on a collection of documents (e.g., documents corpus 144), thereby resulting in identification of a first plurality of documents (e.g., interim documents 146). At operation 422, the search device 110 causes a list of the first plurality of documents to be displayed to a user (e.g., user 102, via user computing device 104).

In some examples, the method further includes generating a similarity score 152 for each document of the first plurality of documents, each of the similarity scores 152 being based on a comparison between each document of the first plurality of documents and the sample document 106, and removing one or more documents from the first plurality of documents based at least in part on the associated similarity score.

In some examples, the method further includes analyzing the first plurality of documents for duplicate documents based on hash values of each document of the first plurality of documents, and removing at least one duplicate document from the first plurality of documents based on matching hash values.

In some examples, the method further includes determining a local term frequency of each term of the first plurality of terms based at least in part on a frequency of occurrence of that term within the sample document, and scoring each term of the first plurality of terms includes dividing the local term frequency of the associated term by the global term frequency of the associated term, thereby generating a term frequency-inverse term global frequency (TF-ITGF) value for the associated term.

In some examples, the method further includes identifying first and second email-type documents from the first plurality of documents, wherein the second email-type document includes at least some content that is included in the first email-type document, and removing the second email-type document from the first plurality of documents.

In some examples, the method further includes causing to be displayed, to the user via a user interface, the list of the first plurality of documents as an interactive list, receiving first user input identifying a selection of one or more documents of the first plurality of documents, resulting in a set of selected documents, receiving second user input initiating another search action based on the set of selected documents, and performing a second search request using the set of selected documents as sample documents.

Additional Examples

An example search system comprises: a processor; and a computer-readable medium storing instructions that are operative upon execution by the processor to: identify a first term occurring within a sample document; score the first term based at least in part on a global term frequency of the first term within a collection of documents; weight the score for the first term based on proximity, within the sample document, of the first term to a second term; create a document search query that includes a proximity-limiting clause restricting a result of the document search query to include documents that have the first term within a threshold distance of the second term; and cause the document search query to be performed resulting in identification of a first resulting document.

An example computer-implemented method comprises: identifying terms occurring within a sample document; scoring each of the terms based at least in part on a global term frequency of the term within a collection of documents; weighting the score for each term based on proximity, within the sample document, of the term to at least one of the other terms; creating a document search query that includes a proximity-limiting clause restricting a result of the document search query to include documents that have a highest-weighted term within a threshold distance of another of the terms; and causing the document search query to be performed resulting in identification of a first resulting document.

An example computer storage device having computer-executable instructions stored thereon, which, on execution by a computer, cause the computer to perform operations comprising: identifying terms occurring within a sample document; scoring each of the terms based at least in part on a global term frequency of the term within a collection of documents; weighting the score for each term based on proximity, within the sample document, of the term to at least one of the other terms; creating a document search query that includes a proximity-limiting clause restricting a result of the document search query to include documents that have a highest-weighted term within a threshold distance of another of the terms; and causing the document search query to be performed resulting in identification of a first resulting document.

An example search system comprises: a processor; and a computer-readable medium storing instructions that are operative upon execution by the processor to: receive a search request, the search request identifying a sample document; identify a first plurality of terms occurring within the sample document; score each term of the first plurality of terms based at least in part on a global term frequency of that term within a collection of documents; weight each term of the first plurality of terms based on proximity, within the sample document, of that term to at least one of the other terms of the first plurality of terms; create a document search query that includes a proximity-limiting clause restricting a result of the document search query to include documents that have a highest-weighted term of the first plurality of terms within a threshold distance of another term of the first plurality of terms; cause the document search query to be performed on a collection of documents, thereby resulting in identification of a first plurality of documents; and cause a list of the first plurality of documents to be displayed to a user.

An example computer-implemented method comprises: receiving a search request, the search request identifying a sample document; identifying a first plurality of terms occurring within the sample document; scoring each term of the first plurality of terms based at least in part on a global term frequency of that term within a collection of documents; weighting each term of the first plurality of terms based on proximity, within the sample document, of that term to at least one of the other terms of the first plurality of terms; creating a document search query that includes a proximity-limiting clause restricting a result of the document search query to include documents that have a highest-weighted term of the first plurality of terms within a threshold distance of another term of the first plurality of terms; causing the document search query to be performed on a collection of documents, thereby resulting in identification of a first plurality of documents; and causing a list of the first plurality of documents to be displayed to a user.

An example computer storage device has computer-executable instructions stored thereon, which, on execution by a computer, cause the computer to perform operations comprising: receiving a search request, the search request identifying a sample document; identifying a first plurality of terms occurring within the sample document; scoring each term of the first plurality of terms based at least in part on a global term frequency of that term within a collection of documents; weighting each term of the first plurality of terms based on proximity, within the sample document, of that term to at least one of the other terms of the first plurality of terms; creating a document search query that includes a proximity-limiting clause restricting a result of the document search query to include documents that have a highest-weighted term of the first plurality of terms within a threshold distance of another term of the first plurality of terms; causing the document search query to be performed on a collection of documents, thereby resulting in identification of a first plurality of documents; and causing a list of the first plurality of documents to be displayed to a user.

Alternatively, or in addition to the other examples described herein, examples include any combination of the following:

receiving a search request, the search request identifying a sample document;

identifying a first plurality of terms occurring within the sample document;

identifying a first term occurring within a sample document;

scoring each term of the first plurality of terms based at least in part on a global term frequency of that term within a collection of documents;

scoring the first term based at least in part on a global term frequency of the first term within a collection of documents;

a collection of documents that is limited to a field of use;

a collection of documents of an organization;

weighting each term of the first plurality of terms based on proximity, within the sample document, of that term to at least one of the other terms of the first plurality of terms;

weighting the score for the first term based on proximity, within the sample document, of the first term to a second term;

creating a document search query that includes a proximity-limiting clause;

creating a document search query that includes a proximity-limiting clause restricting a result of the document search query to include documents that have a highest-weighted term of the first plurality of terms within a threshold distance of another term of the first plurality of terms;

creating a document search query that includes a proximity-limiting clause restricting a result of the document search query to include documents that have the first term within a threshold distance of the second term;

a proximity-limiting clause restricting a result of a document search query to include documents having a first identified term within a threshold distance of another identified term;

causing the document search query to be performed on a collection of documents, thereby resulting in identification of a first plurality of documents;

causing the document search query to be performed resulting in identification of a first resulting document;

searching a collection of documents based on a document search query;

causing a list of the first plurality of documents to be displayed to a user;

displaying a list of documents to a user;

identifying a global term frequency (GTF) table that defines a plurality of frequency buckets;

a frequency bucket includes an associated global frequency value and an associated plurality of words;

searching the GTF table for a frequency bucket having each particular term of the first plurality of terms;

assigning the associated global frequency value of the associated frequency bucket as the score for the particular term;

a document search query further results in identification of a second resulting document;

generating a similarity score for each document of the first plurality of documents, each of the similarity scores being based on a comparison between each document of the first plurality of documents and the sample document;

generating a similarity score for the second resulting document, the similarity score being based on a comparison between the second resulting document and the sample document;

removing one or more documents from the first plurality of documents based at least in part on the associated similarity score;

remove the second resulting document from results of the document search query based at least in part on the associated similarity score;

analyzing the first plurality of documents for duplicate documents based on hash values of each document of the first plurality of documents;

determine that the first resulting document and the second resulting document have the same hash value;

removing at least one duplicate document from the first plurality of documents based on matching hash values;

remove the second resulting document from results of the document search query based on the determining;

determining a local term frequency of each term of the first plurality of terms based at least in part on a frequency of occurrence of that term within the sample document;

determine a local term frequency the first term based at least in part on a frequency of occurrence of the first term within the sample document;

dividing the local term frequency of the associated term by the global term frequency of the associated term, thereby generating a term frequency-inverse term global frequency (TF-ITGF) value for the associated term;

scoring the first term includes dividing the local term frequency of the first term by the global term frequency of the first term, thereby generating a term frequency-inverse term global frequency (TF-ITGF) value for the first term;

identifying first and second email-type documents from the first plurality of documents, wherein the second email-type document includes at least some content that is included in the first email-type document;

identifying first and second email-type resulting documents resulting from the document search query, wherein the second email-type resulting document includes at least some content that is included in the first email-type resulting document;

removing the second email-type resulting document from results of the document search query based on determining that the second email-type resulting document includes at least some content that is included in the first email-type resulting document;

removing the second email-type document from the first plurality of documents;

causing to be displayed, to the user via a user interface, a list of documents as an interactive list including at least the first resulting document;

causing to be displayed, to the user via a user interface, the list of the first plurality of documents as an interactive list;

receiving first user input identifying a selection of one or more documents of the first plurality of documents, resulting in a set of selected documents;

receiving first user input identifying a selection of the first resulting document;

receiving second user input initiating another search action based on the set of selected documents;

receiving second user input initiating another search action based on the selection of the first resulting document;

performing a second search request using the first resulting document as another sample document; and performing a second search request using the set of selected documents as sample documents;

receiving, via a graphical user interface, a user selection of a sample document to initiate a search request;

determining, by a processor, a document search query that includes a proximity-limiting clause restricting a result of the document search query to include documents that have a highest-weighted term of the first plurality of terms within a threshold distance of another term of the first plurality of terms; and automatically moving an icon on a graphical user interface based on results of the document search query.

While the aspects of the disclosure have been described in terms of various examples with their associated operations, a person skilled in the art would appreciate that a combination of operations from any number of different examples is also within scope of the aspects of the disclosure.

Example Operating Environment

Figure 5:
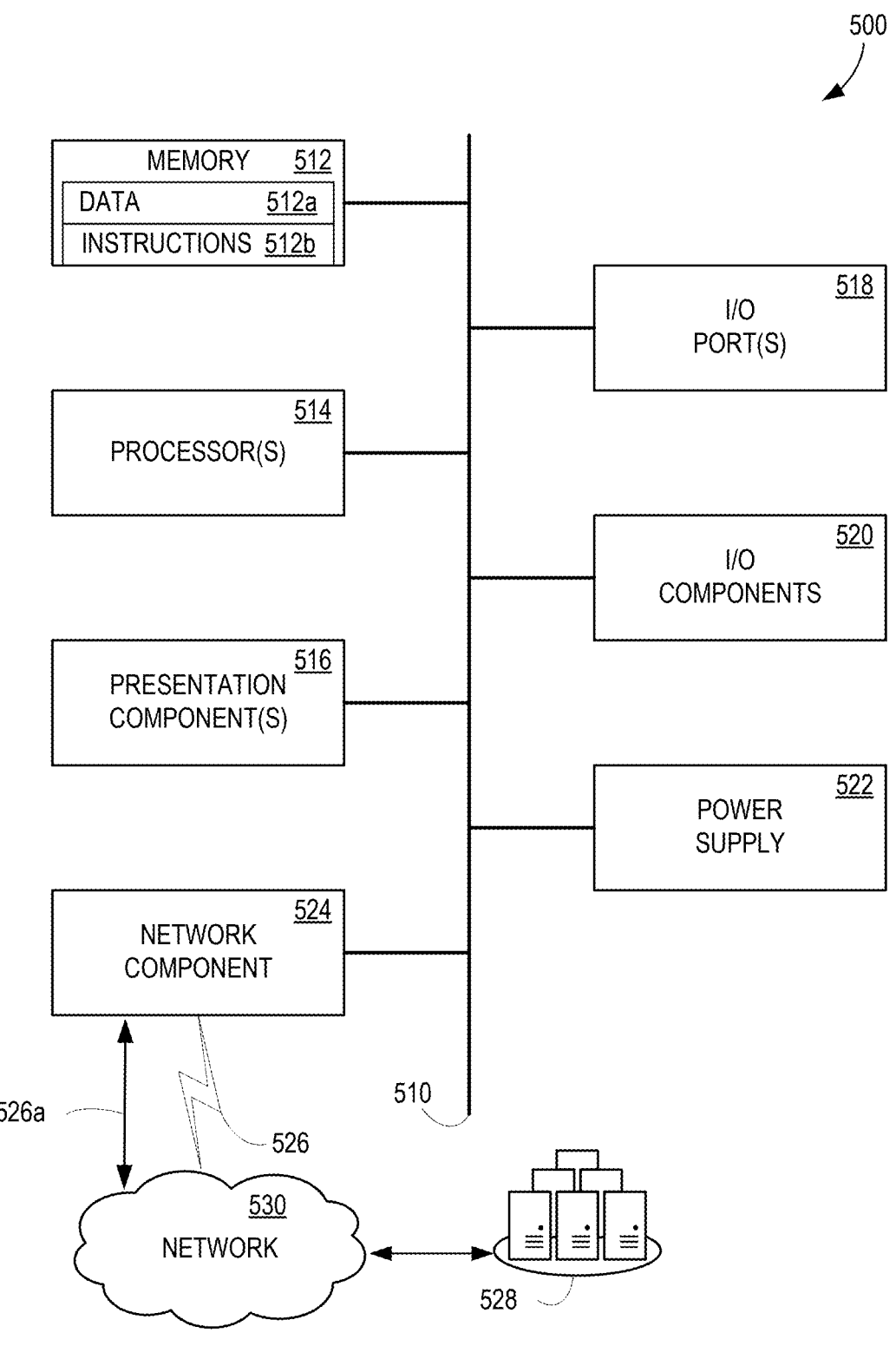
FIG. 5 is a block diagram of an example computing device (e.g., a computer storage device) for implementing aspects disclosed herein.

FIG. 5 is a block diagram of an example computing device 500 (e.g., a computer storage device) for implementing aspects disclosed herein and is designated generally as computing device 500. In some examples, one or more computing devices 500 are provided for an on-premises computing solution. In some examples, one or more computing devices 500 are provided as a cloud computing solution. In some examples, a combination of on-premises and cloud computing solutions are used. Computing device 500 is but one example of a suitable computing environment and is not intended to suggest any limitation as to the scope of use or functionality of the examples disclosed herein, whether used singly or as part of a larger set. Neither should computing device 500 be interpreted as having any dependency or requirement relating to any one or combination of components/modules illustrated.

The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 500 includes a bus 510 that directly or indirectly couples the following devices: computer storage memory 512, one or more processors 514, one or more presentation components 516, input/output (I/O) ports 518, I/O components 520, a power supply 522, and a network component 524. While computing device 500 is depicted as a seemingly single device, multiple computing devices 500 may work together and share the depicted device resources. For example, memory 512 may be distributed across multiple devices, and processor(s) 514 may be housed with different devices.

Bus 510 represents what may be one or more busses (such as an address bus, data bus, or a combination thereof). Although the various blocks of FIG. 6 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 6 and the references herein to a "computing device." Memory 512 may take the form of the computer storage media referenced below and operatively provide storage of computer-readable instructions, data structures, program modules and other data for the computing device 500. In some examples, memory 512 stores one or more of an operating system, a universal application platform, or other program modules and program data. Memory 512 is thus able to store and access data 512a and instructions 512b that are executable by processor 514 and configured to carry out the various operations disclosed herein.

In some examples, memory 512 includes computer storage media. Memory 512 may include any quantity of memory associated with or accessible by the computing device 500. Memory 512 may be internal to the computing device 500 (as shown in FIG. 6), external to the computing device 500 (not shown), or both (not shown). Additionally, or alternatively, the memory 512 may be distributed across multiple computing devices 500, for example, in a virtualized environment in which instruction processing is carried out on multiple computing devices 500. For the purposes of this disclosure, "computer storage media," "computer-storage memory," "memory," and "memory devices" are synonymous terms for the computer-storage memory 512, and none of these terms include carrier waves or propagating signaling.

Processor(s) 514 may include any quantity of processing units that read data from various entities, such as memory 512 or I/O components 520. Specifically, processor(s) 514 are programmed to execute computer-executable instructions for implementing aspects of the disclosure. The instructions may be performed by the processor, by multiple processors within the computing device 500, or by a processor external to the client computing device 500. In some examples, the processor(s) 514 are programmed to execute instructions such as those illustrated in the flow charts discussed below and depicted in the accompanying drawings. Moreover, in some examples, the processor(s) 514 represent an implementation of analog techniques to perform the operations described herein. For example, the operations may be performed by an analog client computing device 500 and/or a digital client computing device 500.

Presentation component(s) 516 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 500, across a wired connection, or in other ways. I/O ports 518 allow computing device 500 to be logically coupled to other devices including I/O components 520, some of which may be built in. Example I/O components 520 include, for example but without limitation, a microphone, joystick, game pad, satellite dish, scanner, printer, wireless device, etc.

Computing device 500 may operate in a networked environment via the network component 524 using logical connections to one or more remote computers. In some examples, the network component 524 includes a network interface card and/or computer-executable instructions (e.g., a driver) for operating the network interface card. Communication between the computing device 500 and other devices may occur using any protocol or mechanism over any wired or wireless connection. In some examples, network component 524 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 524 communicates over wireless communication link 526 and/or a wired communication link 526a to a remote resource 528 (e.g., a cloud resource) across network 530. Various different examples of communication links 526 and 526a include a wireless connection, a wired connection, and/or a dedicated link, and in some examples, at least a portion is routed through the internet.

Although described in connection with an example computing device 500, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A search system comprising:

a processor; and a computer-readable medium storing instructions that are operative upon execution by the processor to, in response to receiving a first search request from a computing device of a user:

identify a first term occurring within a sample document stored in a storage device;

assign a score to the first term based at least in part on a global term frequency of the first term within at least one other document;

weight the score for the first term based on proximity, within the sample document, of the first term to a second term and based on the second term having a score that is within a threshold of the score of the first term;

create a document search query that includes a proximity-limiting clause restricting a result of the document search query to include at least one document that has the first term within a threshold distance of the second term;

cause the document search query to be performed, resulting in identifications of first resulting documents;

remove a duplicate document from the first resulting documents, resulting in at least one filtered resulting document;

cause the at least one filtered resulting document to be displayed on a graphical user interface via the computing device;

in response to receiving a user input from the computing device, identifying a selection of at least one selected document of the at least one filtered resulting document;

in response to receiving a second search request from the computing device, initiating a search action based on the at least one selected document, wherein the second search request is different from the first search request; and performing the search action using the at least one selected document to obtain a result.

2. The search system of claim 1, wherein the assigning further comprises:

identifying a global term frequency (GTF) table that defines frequency buckets, each frequency bucket of the frequency buckets includes an associated global frequency value and an associated plurality of words;

searching the GTF table for a frequency bucket having the first term; and assigning the associated global frequency value of the frequency bucket as the score for the first term.

3. The search system of claim 1, wherein the instructions are further operative to:

generate a similarity score for a first document of the first resulting documents, the similarity score being based on a comparison between the first document and the sample document; and remove the first document from the first resulting documents based at least in part on the similarity score of the first document.

4. The search system of claim 1, wherein the instructions are further operative to remove the duplicate document from the first resulting documents by:

determining that the duplicate document and a first document of the first resulting documents have a same hash value; and removing the duplicate document from the first resulting documents based on the determining.

5. The search system of claim 1, wherein the instructions are further operative to:

determine a local term frequency of the first term based at least in part on a frequency of occurrence of the first term within the sample document, wherein scoring the first term includes dividing the local term frequency of the first term by the global term frequency of the first term, thereby generating a term frequency-inverse term global frequency (TF-ITGF) value for the first term.

6. The search system of claim 1, wherein the instructions are further operative to:

identify first and second email-type resulting documents resulting from the document search query, wherein the second email-type resulting document includes at least some content that is included in the first email-type resulting document; and remove the second email-type resulting document from results of the document search query based on determining that the second email-type resulting document includes at least some content that is included in the first email-type resulting document.

7. The search system of claim 1, wherein removing the duplicate document from the first resulting documents comprises removing the duplicate document based on a hash value of the duplicate document.

8. The search system of claim 1, wherein removing the duplicate document from the first resulting documents comprises identifying identical documents within the first resulting documents.

9. A computer-implemented method for performing a document search, the method comprising:

in response to receiving a first search request from a computing device of a user:

identifying a first term occurring within a sample document stored in a storage device;

assigning, by a computer system, a score to the first term based at least in part on a global term frequency of the first term within at least one other document;

weighting, by the computer system, the score for the first term based on proximity, within the sample document, of the first term to a second term and based on the second term having a score that is within a threshold of the score of the first term;

creating, by the computer system, a document search query that includes a proximity-limiting clause restricting a result of the document search query to include at least one document that has the first term within a threshold distance of the second term;

causing the document search query to be performed by the computer system, resulting in identification of first resulting documents;

removing, by the computer system, a duplicate document from the first resulting documents, resulting in at least one filtered resulting document;

causing the at least one filtered resulting document to be displayed on a graphical user interface via the computing device;

in response to receiving a user input from the computing device, identifying a selection of at least one selected document of the at least one filtered resulting document;

in response to receiving a second search request from the computing device, initiating a search action based on the at least one selected document, wherein the second search request is different from the first search request; and performing, by the computer system, the search action using the at least one selected document to obtain a result.

10. The method of claim 9, wherein the assigning further comprises:

identifying a global term frequency (GTF) table that defines frequency buckets, each frequency bucket of the frequency buckets includes an associated global frequency value and an associated plurality of words;

searching the GTF table for a frequency bucket having the first term; and assigning the associated global frequency value of the frequency bucket as the score for the first term.

11. The method of claim 9, the method further comprising:

generating a similarity score for a first document of the first resulting documents, the similarity score being based on a comparison between the first document and the sample document; and removing the first document from the first resulting documents based at least in part on the similarity score of the first document.

12. The method of claim 9, wherein removing the duplicate document from the first resulting documents comprises:

determining that the duplicate document and a first document of the first resulting documents have matching hash values; and removing the duplicate document from the first resulting documents based on the determining.

13. The method of claim 9, further comprising:

determining a local term frequency of the first term based at least in part on a frequency of occurrence of the first term within the sample document, wherein scoring the first term includes dividing the local term frequency of the first term by the global term frequency of the first term, thereby generating a term frequency-inverse term global frequency (TF-ITGF) value for the first term.

14. The method of claim 9, further comprising:

identifying first and second email-type resulting documents resulting from the document search query, wherein the second email-type resulting document includes at least some content that is included in the first email-type resulting document; and removing the second email-type resulting document from results of the document search query based on determining that the second email-type resulting document includes at least some content that is included in the first email-type resulting document.

15. A computer storage media having computer-executable instructions stored thereon, which, on execution by a computer, cause the computer to perform operations comprising:

in response to receiving a first search request from a computing device of a user:

identifying a first term occurring within a sample document stored in a storage device;

assigning a score to the first term based at least in part on a global term frequency of the first term within at least one other document;

weighting the score for the first term based on proximity, within the sample document, of the first term to a second term and based on the second term having a score that is within a threshold of the score of the first term;

creating a document search query that includes a proximity-limiting clause restricting a result of the document search query to include at least one document that has the first term within a threshold distance of the second term;

causing the document search query to be performed, resulting in identification of first resulting documents;

removing a duplicate document from the first resulting documents, resulting in at least one filtered resulting document;

causing the at least one filtered resulting document to be displayed on a graphical user interface via the computing device;

in response to receiving a user input from the computing device, identifying a selection of at least one selected document of the at least one filtered resulting document;

in response to receiving a second search request from the computing device, initiating a search action based on the at least one selected document, wherein the second search request is different from the first search request; and performing the search action using the at least one selected document to obtain a result.

16. The computer storage media of claim 15, wherein scoring the first term further comprises:

identifying a global term frequency (GTF) table that defines frequency buckets, each frequency bucket of the frequency buckets includes an associated global frequency value and an associated plurality of words;

searching the GTF table for a frequency bucket having the first term; and assigning the associated global frequency value of the frequency bucket as the score for the first term.

17. The computer storage media of claim 15, the operations further comprising:

generating a similarity score for a first document of the first resulting documents, the similarity score being based on a comparison between the first document and the sample document; and removing the first document from the first resulting documents based at least in part on the similarity score of the first document.

18. The computer storage media of claim 15, removing the duplicate document from the first resulting documents comprises:

determining that the duplicate document and a first document of the first resulting documents have a same hash value; and removing the duplicate document from the first resulting documents based on the determining.

19. The computer storage media of claim 15, the operations further comprising:

determining a local term frequency of the first term based at least in part on a frequency of occurrence of the first term within the sample document, wherein scoring the first term includes dividing the local term frequency of the first term by the global term frequency of the first term, thereby generating a term frequency-inverse term global frequency (TF-ITGF) value for the first term.

20. The computer storage media of claim 15, the operations further comprising:

identifying first and second email-type resulting documents resulting from the document search query, wherein the second email-type resulting document includes at least some content that is included in the first email-type resulting document; and removing the second email-type resulting document from results of the document search query based on determining that the second email-type resulting document includes at least some content that is included in the first email-type resulting document.

\* \* \* \* \*